Jan. 27, 1959 W. W. PHARIS 2,871,302

TELEPHONE TRUNKING SYSTEM

Filed Jan. 25, 1956 5 Sheets-Sheet 1

INVENTOR.
W. W. PHARIS

BY [signature]
AGENT

Jan. 27, 1959 W. W. PHARIS 2,871,302

TELEPHONE TRUNKING SYSTEM

Filed Jan. 25, 1956 5 Sheets-Sheet 2

Jan. 27, 1959 W. W. PHARIS 2,871,302

TELEPHONE TRUNKING SYSTEM

Filed Jan. 25, 1956 5 Sheets-Sheet 3

Jan. 27, 1959 W. W. PHARIS 2,871,302

TELEPHONE TRUNKING SYSTEM

Filed Jan. 25, 1956 5 Sheets-Sheet 4

Jan. 27, 1959 W. W. PHARIS 2,871,302

TELEPHONE TRUNKING SYSTEM

Filed Jan. 25, 1956 5 Sheets-Sheet 5

United States Patent Office 2,871,302

Patented Jan. 27, 1959

2,871,302

TELEPHONE TRUNKING SYSTEM

William W. Pharis, Rochester, N. Y., assignor to General Dynamics Corporation, Rochester, N. Y., a corporation of Delaware Application January 25, 1956, Serial No. 561,212

6 Claims. (Cl. 179—27)

Figures 1A, 1B:
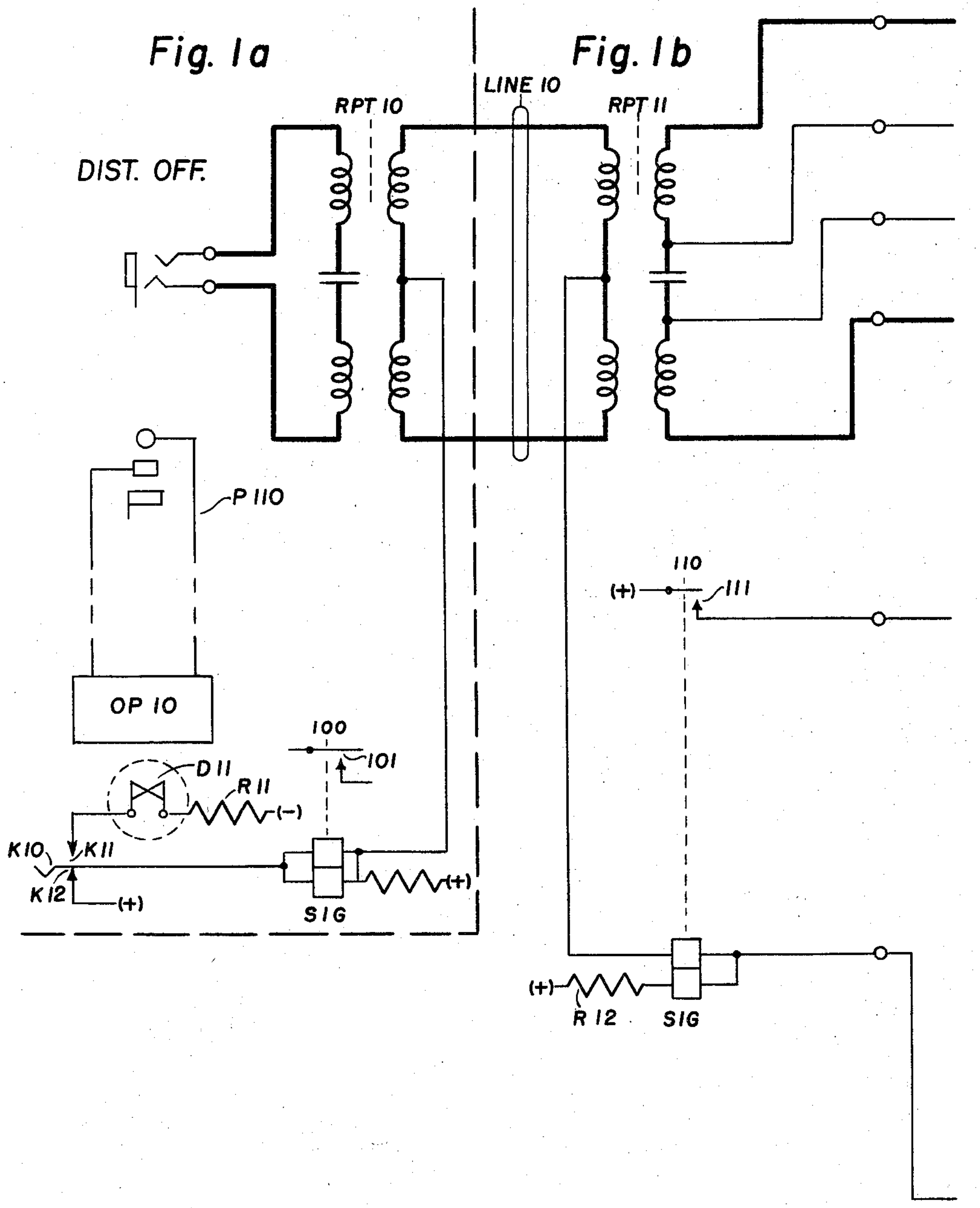
Figure 2:
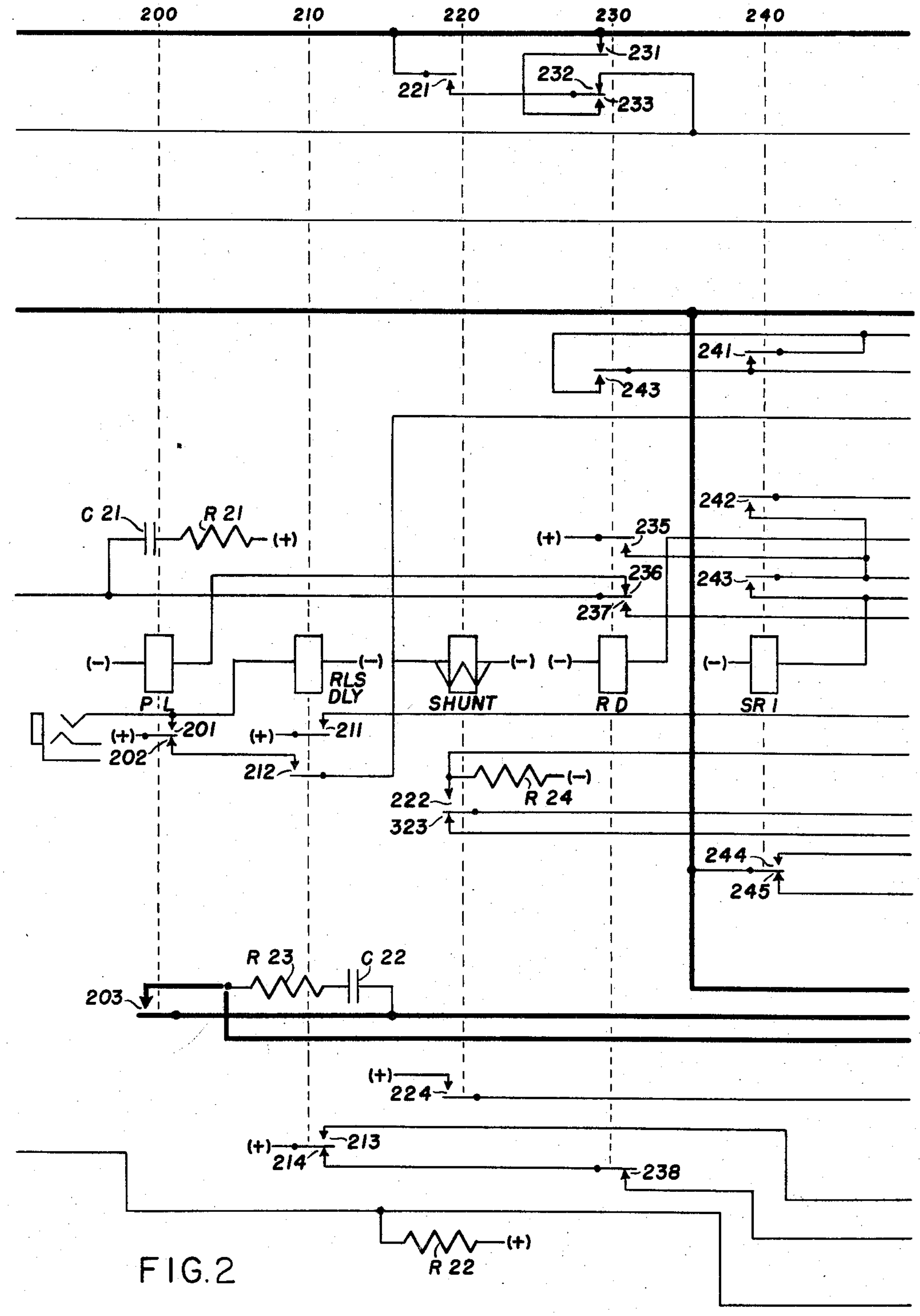
Figure 3:
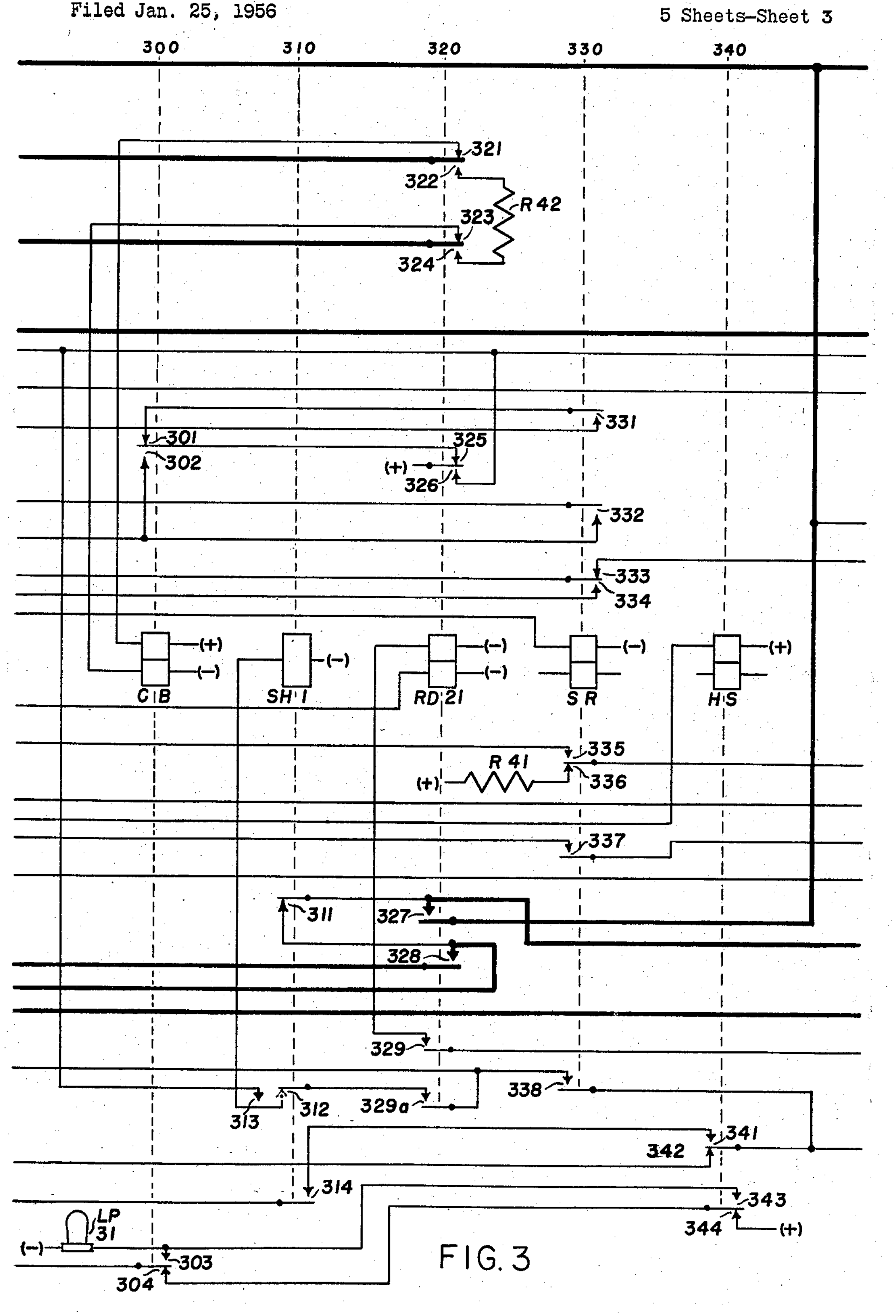
Figure 4:
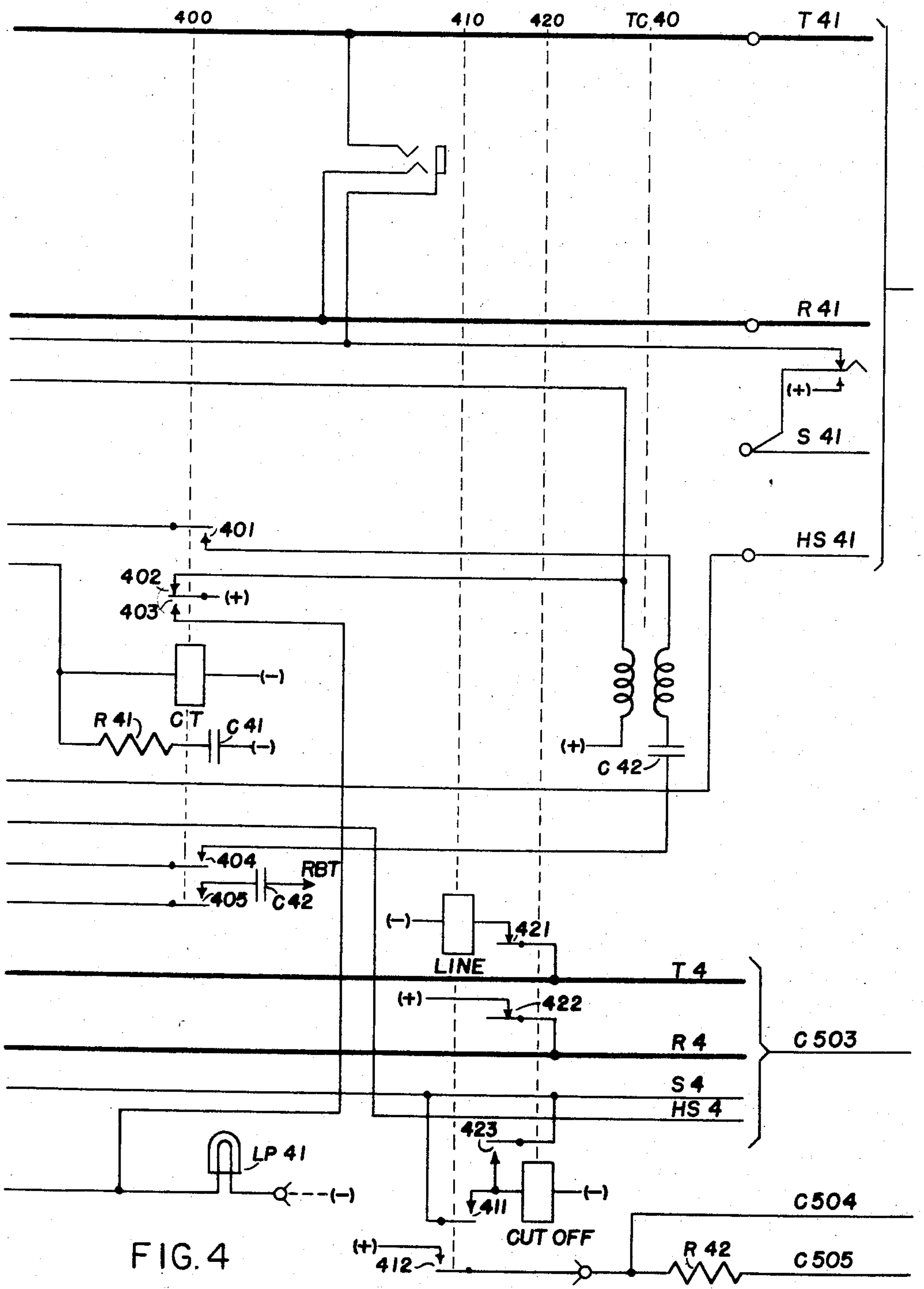

This invention relates to telephone systems in general and more particularly to trunk circuits suitable for use in telephone systems.

In the past, it has been the practice to provide small exchanges of the so-called community dial office type in which both trunks and subscriber lines have access to the same switching circuits. Because it is necessary to inform calling subscribers that the office equipment is in condition to receive dial signals, it is necessary to provide in each of the switching circuits or links means for impressing dial tone on a calling line. In conventional systems such dial tone must necessarily be impressed on calling trunk lines as well as calling subscriber lines. While the passing back of dial tone over the calling trunk lines has not been a serious problem in the past, the integration of small telephone systems, where such practice is observed, into larger toll dialing networks carries with it the obvious disadvantage of passing back dial tone to a subscriber (in the case of direct distance dialing) or calling toll operator after a connection has been extended through originating and intermediate switching equipment to the terminating exchange. Such tone is not only unnecessary but may be harmful in that the tone signal might be misinterpreted at the originating station or might interfere with audio-frequency responsive apparatus in the preceding switching equipment.

Accordingly, it is an object of my invention to provide a new and improved telephone system.

Another object of my invention is to provide a trunk circuit capable of eliminating the transmission of dial tone to a calling operator from a community dial office.

I accomplish these and other objects in a telephone system including a community dial office and a remotely located operator position. A trunk line interconnecting the operator position with the office and a subscriber line to the office are terminated in first and second line circuits, respectively, at the office. Each line is capable of placing a calling condition on its terminating or line circuit and is thereafter effective for extending directive signals applied from its remote end to the office switching equipment.

The office also includes a link comprising means such as a linefinder which operates in response to a calling condition on either of the aforesaid line circuits for extending a connection from the corresponding line to means for further extending connections into the office. A dial tone source is associated with the link. Means within the link is effective for connecting the tone source to the connection extending means in order to indicate to the calling subscriber line that the link is in condition to receive directive signals. The link is additionally provided with conventional means responsive to the receipt of the first of the directive signals from a calling one of the lines for disconnecting the tone source from the link. According to this invention, the first of the aforementioned line circuits only is provided with means for preventing the transmission of audible signals including the tone signal to the operator position. Other means in the first line circuit is operative in response to the receipt of the first of the directive signals from the operator position for rendering the tone transmission preventing means inoperative in order to restore audible signal communications between the operator position and the link after the tone source has been disconnected from the link.

Figures 5A, 5B:
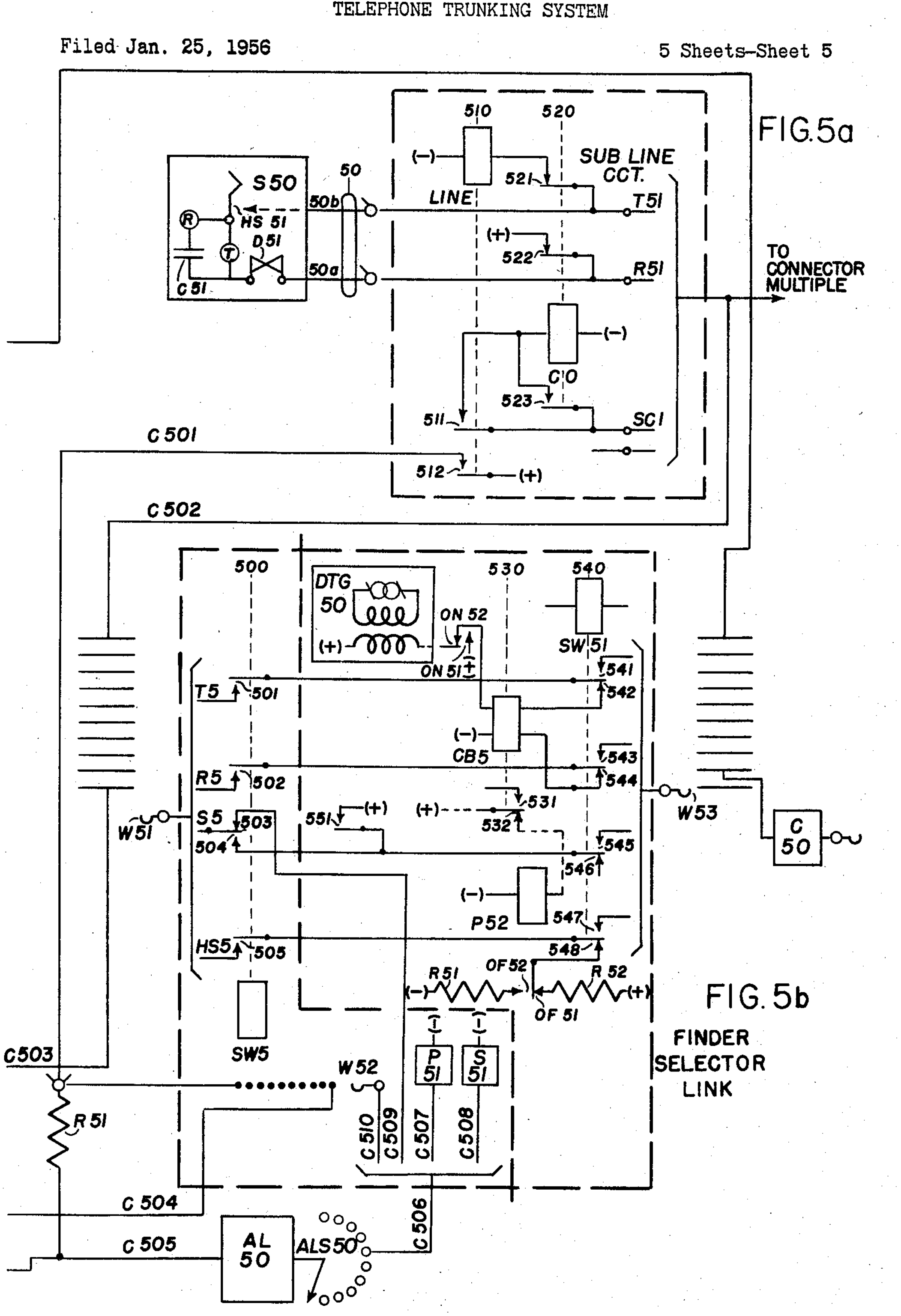

Further objects and advantages of my invention will become apparent as the following description proceeds. The points of novelty which characterize my invention are set forth with particularity in the claims annexed to and forming a part of this specification. For a better understanding of the description, reference may be had to the accompanying drawings, in which:

Fig. 1*a* shows in skeletonized form the equipment located at the remote operator position;

Figs. 1*b* and 2–4 show a trunk line extending from the distant operator position and a termination for the trunk line;

Fig. 5*a* shows a line circuit for terminating a subscriber line; and,

Fig. 5*b* shows in skeletonized form a linefinder-selector link.

The apparatus referred to in the following description is made to function from power supplied from a source such as a battery. The most positive terminal or plate of the battery is connected to ground and is referred to hereinafter as "ground" and in the drawings as (+). The most negative, ungrounded terminal or plate of the battery is referred to as "battery" and in the drawings as (—).

*Extension of a call from a subscriber's line*

The contemplated telephone system which forms the preferred embodiment of my invention includes a community dial office at which each of a plurality of subscriber lines, such as 50, are terminated on line circuits such as the one shown in Fig. 5*a*. A call is originated in the well understood manner by removing the handset at the station from its cradle thereby closing hookswitch contacts HS51 to complete an operating circuit for line relay 510. The operating circuit is traced from ground through break contacts 522, conductor 50*a*, dial impulsing contacts D51, transmitter T, now closed contacts HS51, conductor 50*b*, hookswitch contacts HS51, break contacts 521 and the winding of relay 510 to battery. Relay 510 thereupon operates.

The operation of relay 510 closes contacts 512 and is effective for energizing allotter AL50 over conductor C501 by way of resistor R51. Because the operation of the allotter and the linefinder is not a part of the present invention and is well understood by those skilled in the telephone art, the description of these components is confined to functional terms. Means comprising a switch, such as ALS50, within the allotter is effective for selecting an idle linefinder-selector link such as the one shown in Fig. 5*b* and for thereafter causing the selected linefinder to operate. Upon the energization of the starting circuit for allotter AL50, pulsing means within the allotter is effective for intermittently energizing primary advancing magnet P51 over conductor C507 thereby advancing the linefinder switch wipers shown collectively as W51 to the various levels of terminals in the linefinder bank to which wipers W51 have access. Auxiliary wiper W52 is also advanced in response to each energization of magnet P51 across a bank of terminals, each of which correspond to one of the levels of the wiper banks. When wiper W52 encounters a level marking terminal corresponding to the level in which the calling line, such as 50, is terminated, ground transmitted over a circuit comprising conductor C501, wiper W52 and conductor C510 to the primary stopping circuit in allotter AL50 is effective for causing allotter AL50 to stop sending impulses to magnets P51. The primary movements of the wipers W51 stop.

Upon the operation of the stopping means within allotter AL50, other means transfer the impulsing means into connection with conductor C508 which in turn is connected to the secondary advancing means within the linefinder. The resulting intermittent operation of secondary magnet S51 is effective for advancing wipers W51 successively into engagement with each succeeding terminal set in the level opposite which wipers W51 were stopped. Upon the engagement of the terminal set of the calling line such as the one shown in Fig. 5*a*, resistance battery from relay 520 and through make contacts 511 is transmitted over the calling line conductor such as S51 and one of the wipers W51 which is connected to conductor S5 of the linefinder. The resistance battery is transmitted through break contacts 503 and conductor C509 to means (not shown in detail) in allotter AL50 effective for operating switchthrough relay 500 and for disconnecting allotter AL50 including the impulsing means from the linefinder shown in Fig. 5*b*.

The operation of relay 500 is effective for extending calling line conductors T51 and R51 through the corresponding wipers W51 to conductors T5 and R5, respectively, thence through make contacts 501 and 502, respectively, to bring about the seizure of the linefinder-selector link from the calling line. The seizure is effected when the operating circuit for calling bridge relay 530 is completed through the hookswitch contacts HS51 of the calling line station. The circuit is traced from ground through the low impedance dial tone source such as generator DTG50, off-normal contacts ON52 of the selector switch, the upper winding of relay 530, break contacts 542, make contacts 501, one of the wipers W51 and the corresponding terminal of the linefinder multiple, conductors T51 and 50*b*, make contacts HS51, transmitter T, dial impulsing contacts D51, conductors 50*a* and R51, a terminal of the calling line in the linefinder multiple bank and the corresponding one of wipers W51, conductors R5, make contacts 502, break contacts 544 and the lower winding of relay 530 to battery. Current flowing in the above traced loop is effective for operating relay 530.

The operation of relay 530 is effective for causing well known means (not shown) to operate make contacts 551 to complete an operating circuit for cutoff relay 520 of the calling line circuit. The operating circuit is traced from ground through make contacts 551 and 504, conductor S5, the corresponding one of wipers W51 and a terminal of the calling line circuit, conductor S51, make contacts 511 and the winding of relay 520 to battery. Relay 520 operates and is effective for releasing relay 510 by opening the latter's operating circuit at break contacts 521 and 522. The operation of relay 520 is also effective for closing a locking circuit for itself comprising make contacts 523 which are in parallel to now-opened make contacts 511.

The operation of relay 530 is effective for preparing other well known means within the selector circuit (not shown) for energizing the selector primary magnet P52 for operation. The completion of the above traced connection between tone source DTG50 and the calling line is effective for actuating receiver R at station S50. Current from DTG50 applied to the conductors of line 50 passes from conductor 50*b* through contacts HS51, receiver R, capacitor C51, dial contacts D51 and conductor 50*a* through the previously traced circuit to the lower winding of relay 530 through the battery to ground. The application of dial tone to receiver R indicates to the subscriber at the calling station that the link is ready to receive directive signals comprising trains of impulses generated by the systematic opening and closing of the impulsing dial contacts D51 at the calling station.

It is pointed out that the above described linefinder is part of a link circuit which also includes a selector switch tied tail-to-tail with the linefinder in the manner well understood to those skilled in the telephone art. The selector includes a switch operated in response to directive signals transmitted from the calling line for extending a connection from the calling line through the operated linefinder further into the office in the direction of the required destination such as a called line. The selector operation is next described.

Successive operations of the calling station S50 dial are effective for operating impulse contacts D51 in the above described manner to transmit the first and subsequent digits of the directory number of the called line to the community dial office switching equipment. The transmission of the first train of impulses repeatedly opens and recloses the above traced operating circuit of relay 530 at contacts D51. Relay 530 thereupon repeats the impulses to energize the well understood circuit for controlling primary magnet P52 of the selector switch. The circuit is completed upon each release of relay 530 from ground through break contacts 532 and the winding of magnet P52 to battery. Each energization of magnet P52 is effective for advancing the selector switch wipers, shown collectively as W53, one additional step in the primary direction away from the normal position of the wipers in order to select one of the levels of multiple bank contacts to which wipers W53 have access. The advance of wipers W53 away from their normal position is effective in the well understood manner for operating and opening normally closed and closing normally open selector off-normal contacts. In the preferred embodiment of my invention, the operation of the off-normal contacts is effective for disconnecting the tone source DTG50 from the previously described loop including receiver R of calling station S50 at break off-normal contacts ON52, and for replacing this ground source with a direct ground through make contacts ON51 thereby removing dial tone from the calling subscriber receiver.

After the first directive signal has caused the advance of wipers W53 to a point opposite the level in which the succeeding switching equipment, such as connector C50, is terminated, well known means (not shown) within the selector is effective to advance wipers W53 within the selected level in order to further extend the connection from calling line 50 in the direction of the called line through connector C50. Upon the advance of the wipers W53 into engagement with the terminal set for connector C50, well known means (not shown) cause a switchthrough relay 540 to operate and thereby complete the extension process at make contacts 541, 543, 545 and 537.

*Extension of a call from an incoming trunk line*

The contemplated telephone system also includes trunk lines such as 10 extending from a remote point such as the operator position shown in Fig. 1*a* and terminating on line circuits such as the one shown in Figs. 1*b* and 2–4. A connection may be extended from a calling one of the trunk lines into the exchange through a linefinder-selector link such as the one shown in Fig. 5*b*. This process is next described.

In the preferred embodiment of my invention, a call may be originated over a trunk line by inserting plug P10 which is connected to operator's telephone OP10 into jack J10 in order to connect telephone OP10 to line 10. The trunk line is seized by operating key K10.

The operation of key K10 is effective for transferring the well known simplex signaling leg conductor from its normal connection to ground at contacts K12 to a connection to battery through dial contacts D11 and resistor R11 thereby operating signal relay 110 in the community dial office. The operation of relay 110 is effective for operating pulsing relay 200 over the following circuit: from ground through make contacts 111, break contacts 236 and the winding of relay 200 to battery. The operation of relay 200 is effective for operating release delay relay 210 over an obvious circuit including make contacts 201 and for preparing a circuit for operating line relay 410 at make contacts 203. The operation of relay 210 is effective for operating release delay repeater relay 320 over an obvious circuit including make contacts 211 and for preparing an operating circuit for shunt relay 220 at make contacts 212.

The operation of relay 320 is effective for completing the operating circuit for line relay 410 which is traced from ground through break contacts 422, now operated make contacts 203 and 328, the lower righthand winding of repeat coil RPT11, make contacts 324, resistor R42, make contacts 322, the upper righthand winding of repeat coil RPT11, make contacts 327, break contacts 421 and the winding of relay 410 to battery. At this time an alternate circuit exists between conductors T4 and R4 of the trunk line termination. The latter circuit is traced from conductor T4 through break contacts 311 and make contacts 203 to conductor R4. The alternate circuit is effective for shorting out the righthand windings of repeat coil RPT11 in order to prevent the transmission of audio-frequency signals including dial tone over the talking channel comprising the talking conductors of the trunk line termination and the trunk line.

The operation of relay 320 is also effective for marking the trunk line circuit as busy at its selector bank appearance by connecting ground through make contacts 326 and break contacts of the make busy key to conductor S41 and the selector bank multiple terminal corresponding to the trunk line.

The operation of relay 410 which corresponds in function to the previously described line relay 510 of the line circuit of Fig. 5*a* is effective for energizing allotter AL50 over conductor C505 through resistor R42 from ground through make contacts 412. Ground from the same source is also extended to the level marking terminals corresponding to the level in which the calling trunk line is terminated in the linefinder bank multiple; such ground is extended over conductors C504. Thereupon allotter AL50 is effective in the previously described manner to select an idle linefinder-selector link such as the one shown in Fig. 5 and to drive the wiper set such as W51 of the selected linefinder into engagement with the terminal set to which conductors T4, R4, S4 and HS4 of the calling trunk line are connected. Upon the finding of the calling trunk line, the linefinder-switchthrough relay 500 again operates in order to extend a connection from the talking conductors of the linefinder-selector link to the talking channel of the calling line and to the remotely located operator telephone OP10. The operation of the linefinder is effective for operating calling bridge relay 530 by bridging a winding of the latter relay between the conductors T4 and R4 of the trunk line termination so that the above described operating circuit for relay 410 comprising resistor R42 is also effective for completing the operating loop of relay 530. The operation of the linefinder is also effective for completing a circuit for operating cutoff relay 420 upon the completion of the seizure operation of the linefinder-selector link by the operation of make contacts 551 (Fig. 5*b*). The circuit for operating relay 420 is traced from ground through make contacts 551 and 504, conductor S5, the corresponding one of wipers W51, conductor S4, make contacts 411 and the winding of relay 420 to battery. The operation of relay 420 is effective for completing a locking circuit for itself through make contacts 423 and for disconnecting the previously traced operating circuit for relay 410 at break contacts 421 and 422.

The operation of the linefinder is also effective for connecting the low impedance dial tone source DTG50 across conductors T4 and R4 of the calling trunk line termination in the same manner that the tone source was bridged across conductors T51 and R51 of the calling subscriber line. At this time, however, according to the invention, the above described alternate circuit between conductors T4 and R4 is effective for preventing dial tone connected to conductors T4 and R4 from being transmitted over line 10 to the calling operator telephone OP10.

The operator at the distant office termination transmits directive signals to the community dial office switching equipment by operating the dial associated with key K10. The operation of the dial is effective for repeatedly opening and reclosing impulsing contacts D11 to transmit a series of trains of impulses over the simplex signaling circuit. The trains of impulses cause relay 110 to repeat each impulse thereby causing corresponding openings and closings of the operating circuit of relay 200 at make contacts 111. Relay 200 thereupon follows the impulses and opens and closes the previously traced operating circuit for calling bridge relay 530 in the selector of Fig. 5*b* at make contacts 203. In response to the first release of relay 200, a circuit for operating shunt relay 220 is completed from ground through break contacts 202, make contacts 212 and the winding of relav 220 to battery. Both relays 210 and 220 are of the slow release type and therefore are held in operated condition throughout the impulsing operation of relay 200.

The operation of relay 220 is effective for closing an operating circuit for shunt repeater relay 310. The circuit for operating relay 310 is traced from ground through make contacts 224 and 329*a*, break contacts 312 and the winding of relay 310 to battery. The operation of relay 310 is effective for closing a locking circuit for itself that is maintained so long as relay 320 remains operated (i. e., so long as the circuit remains held from the distant office). The locking circuit is traced from battery through the winding of relay 320, make contacts 313 and 326 to ground. The operation of relay 310 is also effective for opening the previously traced alternate circuit between conductors T4 and R4 at break contacts 311. At this time, according to the invention, the opening of the alternate circuit removes the short across the talking channel of the trunk line and trunk line terminating circuits to permit the transmission of audible signals from the talking conductors of the community dial office linefinder-selector link to the remote operator position.

The impulsing operation of relay 200 is effective for repeatedly opening the above described operating circuit of relay 530 at contacts 203. Thereupon the selector wipers shown as W53 are advanced in the same manner as that described in connection with the description of a call from the subscriber line. Thus the selector portion of the linefinder-selector link thereafter operates in response to impulses transmitted from the trunk line circuit to select succeeding switching equipment such as connector C50 in order to further extend a connection from the calling trunk line 10 into the community dial office. The advance of wipers W53 away from their normal position is effective for operating the selector off-normal contacts, thereby removing dial tone from the talking channel in the previously described manner at break contacts ON51. The above described removal of the short across the talking channel conductors T4 and R4 and the subsequent restoration of audible signal transmission from the selector takes place during the time that the dial tone source is being disconnected from the finder-selector link. Thus the transmission of dial tone to the calling operator position is prevented.

At the conclusion of a call from either a subscriber or trunk line, the office switching equipments including the finder and selector switches shown in Fig. 5*b* are released by means well known and understood by those skilled in the telephone art.

While I have shown and described a particular embodiment of my invention, it will be obvious to those skilled in the art that changes and modifications may be made without departing from the invention in its broader aspects. I, therefore, aim in the appended claims to cover all such changes and modifications as fall within the true spirit and scope of my invention.

What is claimed is:

1. In a telephone system, an office, a link in said office, a line circuit in said office, an operator position, means comprising a line terminated in said circuit for extending a connection from said position to said office, means in said line circuit operative in response to a calling condition on said line for placing said line circuit in calling condition, said link comprising a linefinder seizable in response to a calling condition on said line circuit for extending a connection from said connection extending means into said office, a tone source, means operative in response to the seizure of said link for connecting said tone source to said connection extending means, and means within said line circuit for preventing the transmission of a tone signal from said source over said line, thereby making a tone signal applied to said connection extending means inaudible at said operator position.

2. In a telephone system, an office, a link in said office, a line circuit in said office, an operator position comprising an impulse transmitting device, means comprising a line terminated in said line circuit for extending a connection from said position to said office, means in said line circuit operative in response to a calling condition on said line for placing said line circuit in calling condition, a link comprising a linefinder operative in response to a calling condition on said line circuit for extending a connection from said connection extending means into said office, a tone source, means within said link operative in response to the operation of said linefinder for connecting said tone source to said connection extending means, blocking means within said line circuit for preventing the transmission of a tone signal from said source to said line, means in said line circuit operative in response to the operation of said impulse transmitting means for repeating directive signals to said link, and means operative in response to the operation of said repeating means for rendering said blocking means inoperative.

3. In a telephone system, an office, a link in said office, a line circuit in said office, a line terminating on said line circuit, an operator position comprising an impulse transmitting device, a talking channel comprising said line extending from said position to said office, means at said operator position for placing said line circuit in calling condition, said link comprising a linefinder seizable in response to a calling condition on said line circuit for extending a connection from said talking channel into said office, means in said operator position for causing said line circuit to assume an operated condition, means responsive to the operated condition of said line circuit for operating said linefinder, a tone source, means operative in response to the seizure of said link for connecting said tone source to said talking channel, means within said line circuit for blocking said talking channel to make a tone from said source inaudible at said operator position, means in said line circuit for repeating directive signals from said impulse transmitting device transmitted over said line into said link, means in said line circuit operative in response to the operation of said repeating means for rendering said blocking means inoperative, and means in said link operative in response to the operation of said repeating means for rendering said tone connecting means inoperative.

4. In a telephone system, an office, a link in said office, first and second line circuits in said office, means in each of said line circuits operative in response to a calling condition on the corresponding one of said lines for placing the line circuit in calling condition, an operator position, a subscriber's telephone, a first line terminated in said first line circuit for extending a connection from said station to said office, means comprising a second line terminated in said second line circuit for extending a connection from said operator position to said office, said link comprising a linefinder seizable in response to a calling condition on either of said line circuits for extending a connection from the corresponding one of said lines into said office, a tone source, means responsive to the seizure of said link for connecting said tone source to the calling one of said lines, and blocking means in said second line circuit for preventing the transmission of a tone signal from said source to said line, thereby making a tone from said source inaudible at said operator position.

5. The system set forth in claim 4 and having in addition means at said operator position for transmitting directive impulses over said second line and means in said second line circuit for repeating directive signals from said impulse transmitting device which are transmitted over said second line into said link, and means operative in response to the operation of said repeating means for rendering said blocking means inoperative.

6. The system set forth in claim 4 and having in addition means at said operator position for transmitting directive impulses over said second line and means in said second line circuit for repeating directive signals from said impulse transmitting device which are transmitted over said second line into said link, means operative in response to the operation of said repeating means for rendering said blocking means inoperative, and means in said link operative in response to the receipt of directive impulses for rendering said tone connecting means inoperative.

No references cited.